(12) United States Patent
Xing et al.

(10) Patent No.: US 8,144,662 B2
(45) Date of Patent: Mar. 27, 2012

(54) METHOD AND APPARATUS FOR NEIGHBOR LIST UPDATES

(75) Inventors: Helen Jun Xing, San Diego, CA (US); Muhammad Khawar R. Khan, Chula Vista, CA (US); Rami H. Alnatsheh, San Diego, CA (US); Ramesh Chandra Chirala, San Diego, CA (US); Supratik Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 770 days.

(21) Appl. No.: 12/208,764

(22) Filed: Sep. 11, 2008

(65) Prior Publication Data

US 2009/0137246 A1 May 28, 2009

Related U.S. Application Data

(60) Provisional application No. 60/973,041, filed on Sep. 17, 2007.

(51) Int. Cl.
*H04W 4/00* (2009.01)

(52) U.S. Cl. ...................................... 370/331

(58) Field of Classification Search .................. 370/331; 455/436, 439, 442
See application file for complete search history.

(56) References Cited

U.S. PATENT DOCUMENTS

| 6,567,480 | B1 * | 5/2003 | Brardjanian et al. | 375/331 |
| 2003/0081571 | A1 * | 5/2003 | Hur | 370/331 |
| 2003/0099215 | A1 * | 5/2003 | O'Shea | 370/331 |
| 2007/0049278 | A1 * | 3/2007 | Lindoff et al. | 455/439 |

FOREIGN PATENT DOCUMENTS

| JP | 2008219645 | 9/2008 |
| WO | WO2005101890 | 10/2005 |

OTHER PUBLICATIONS

International Search Report & Written Opinion—PCT/US2008/077935, International Searching Authority—European Patent Office—Jun. 25, 2009.

* cited by examiner

*Primary Examiner* — Derrick Ferris
*Assistant Examiner* — Mang Yeung
(74) *Attorney, Agent, or Firm* — Darren M. Simon

(57) ABSTRACT

An apparatus and method for maintaining information during neighbor list updates comprising acquiring information of a first plurality of GSM neighbor cells; recording and keeping the information for a time period T; receiving a second plurality of GSM neighbor cells; comparing the second plurality of GSM neighbor cells with the first plurality of GSM cells in the record; if a GSM neighbor cell from the second plurality of GSM neighbor cells is not in the record, gathering information pertaining to the GSM neighbor cell; and if at least one GSM neighbor cell from the second plurality of GSM neighbor cells is in the record, determining if the age of the information pertaining to the at least one GSM neighbor cell is less than the time period T and if less than T, locating the at least one GSM neighbor cell.

32 Claims, 6 Drawing Sheets

METHOD AND APPARATUS FOR NEIGHBOR LIST UPDATES

CLAIM OF PRIORITY UNDER 35 U.S.C. §119

The present application claims priority to U.S. Provisional Application No. 60/973,041 entitled Method and Apparatus for Neighbor List Updates filed Sep. 17, 2007, and assigned to the assignee hereof and hereby expressly incorporated by reference herein.

FIELD

This disclosure relates generally to wireless telecommunications. More particularly, the disclosure relates to maintaining frequency offset and timing information through a neighbor list update.

BACKGROUND

Wireless communication systems are widely deployed to provide various types of communication to mobile users such as voice, data, etc. Mobile user equipments (UEs) typically transition from one wireless system to another wireless system depending on their mobility and the availability of coverage by the wireless systems. For example, transitions can occur between second generation (2G) and third generation (3G) wireless systems, between long term evolution (LTE) and 3G wireless systems or between LTE and Global System for Mobile Communications (GSM) wireless systems. Taking one example, 2G wireless systems typically provide basic digital voice and low rate data services to user equipment (UE) over a broad coverage area. That is, the 2G wireless systems typically have ubiquitous coverage. Broad coverage area is implemented using a plurality of cells, each with an access node (e.g. base station) to provide a wireless access connection between a UE, which is mobile within the coverage area, and the wireless communication system. Multiple access refers to the property of allowing users to have simultaneous or near-simultaneous wireless access to a network over a shared communications medium. The wireless access connection may employ space division multiple access (SDMA), frequency division multiple access (FDMA), time division multiple access (TDMA), code division multiple access (CDMA) and/or orthogonal frequency division multiple access (OFDMA) to allow a plurality of UEs to access the wireless communication system. In one example, the 2G wireless system is based on Global System for Mobile Communications (GSM)/General Packet Radio Service (GPRS)/Enhanced Data Rates for GSM Evolution (EDGE) while the 3G wireless system is based on Universal Mobile Telecommunication System (UMTS). A system may be designed to support one or more standards such as the standard offered by a consortium named "3rd Generation Partnership Project" referred to herein as 3GPP, IS-95, cdma2000, IS-856, W-CDMA, TD-SCDMA, WiMax, Ultra Mobile Broadband (UMB) and other standards.

Many wireless communication systems are upgrading their infrastructure to provide enhanced communication services, such as high rate data services and Internet protocol (IP) packet transport services to mobile UEs. These enhanced communication services are typically provided by 3G wireless systems. In many cases, the 3G wireless systems are implemented only in portions of the broad coverage area provided by 2G wireless systems. That is, in many cases 3G wireless systems do not provide ubiquitous coverage. 3G coverage areas are typically situated in high density population areas, such as the centers of urban areas, airports, shopping centers, business parks, etc. In this case, 3G coverage areas appear as islands of coverage within the broader 2G coverage areas. This diversity of coverage areas introduces the necessity of transitioning the wireless access connection of the mobile UE between the 2G coverage area and 3G coverage area. Although the example of transitioning between the 2G coverage area and 3G coverage area is discussed here, the UE may transition between any coverage areas of any radio access technologies employed by any wireless systems, including but not limited to, UMTS (universal mobile telecommunication system), GSM (Global System for Mobile communications), GSM/GPRS (General Packet Radio Service /EDGE (Enhanced Data Rates for GSM Evolution), LTE (long term evolution), IS-95 (interim standard 95), CDMA2000, EVDO (evolution data optimized) or UMB (ultra mobile broadband), etc. And, during transitioning, services may be dropped if the transitioning procedure is delayed.

SUMMARY

Disclosed is an apparatus and method for maintaining frequency offset and timing information during neighbor list updates. According to one aspect, a method for maintaining frequency offset and timing information during neighbor list updates comprising: acquiring a frequency offset and a timing information of each of a first plurality of GSM neighbor cells; recording an identity, the frequency offset and the timing information of each of the first plurality of GSM neighbor cells and keeping the frequency offset and the timing information for a time period T in a record; receiving a list of a second plurality of GSM neighbor cells; comparing an identity of each of the second plurality of GSM neighbor cells with the identity of each of the first plurality of GSM cells in the record; if a GSM neighbor cell from the second plurality of GSM neighbor cells is not in the record, gathering frequency offset and timing information pertaining to the GSM neighbor cell; and if at least one GSM neighbor cell from the second plurality of GSM neighbor cells is in the record, determining if the age of the frequency offset and timing information pertaining to the at least one GSM neighbor cell is less than the time period T and if the age is less than the time period T, locating the at least one GSM neighbor cell.

In another aspect, a user equipment comprising a processor and a memory, the memory containing program code executable by the processor for performing the following: acquiring a frequency offset and a timing information of each of a first plurality of GSM neighbor cells; recording an identity, the frequency offset and the timing information of each of the first plurality of GSM neighbor cells and keeping the frequency offset and the timing information for a time period T in a record; receiving a list of a second plurality of GSM neighbor cells; comparing an identity of each of the second plurality of GSM neighbor cells with the identity of each of the first plurality of GSM cells in the record; if a GSM neighbor cell from the second plurality of GSM neighbor cells is not in the record, gathering frequency offset and timing information pertaining to the GSM neighbor cell; and if at least one GSM neighbor cell from the second plurality of GSM neighbor cells is in the record, determining if the age of the frequency offset and timing information pertaining to the at least one GSM neighbor cell is less than the time period T and if the age is less than the time period T, locating the at least one GSM neighbor cell.

In another aspect, a wireless communication device for maintaining frequency offset and timing information during neighbor list updates comprising: means for acquiring a frequency offset and a timing information of each of a first plurality of GSM neighbor cells; means for recording an identity, the frequency offset and the timing information of each of the first plurality of GSM neighbor cells and keeping the frequency offset and the timing information for a time period T in a record; means for receiving a list of a second plurality of GSM neighbor cells; means for comparing an identity of each of the second plurality of GSM neighbor cells with the identity of each of the first plurality of GSM cells in the record; means for determining if the age of the frequency offset and timing information pertaining to at least one GSM neighbor cell from the second plurality of GSM neighbor cells is less than the time period T, wherein the at least one GSM neighbor cell is in the record; and means for locating the at least one GSM neighbor cell from the second plurality of GSM neighbor cells, wherein the age of the frequency offset and timing information is less than the time period T.

In another aspect, a computer program product, comprising a computer-readable medium including program codes stored thereon, comprising program codes for acquiring a frequency offset and a timing information of each of a first plurality of GSM neighbor cells; program codes for recording an identity, the frequency offset and the timing information of each of the first plurality of GSM neighbor cells and keeping the frequency offset and the timing information for a time period T in a record; program codes for receiving a list of a second plurality of GSM neighbor cells; program codes for comparing an identity of each of the second plurality of GSM neighbor cells with the identity of each of the first plurality of GSM cells in the record; program codes for determining if the age of the frequency offset and timing information pertaining to at least one GSM neighbor cell from the second plurality of GSM neighbor cells is less than a time period T, wherein the at least one GSM neighbor cell is in the record; and program codes for locating the at least one GSM neighbor cell from the second plurality of GSM neighbor cells, wherein the age of the frequency offset and timing information is less than the time period T.

Advantages of the present disclosure include reducing the time to identify GSM neighbor cells through a neighbor list update. Additional advantages also include avoiding dropped calls and improving success in transitioning between wireless systems in a shorter amount of time, and improving user experience.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
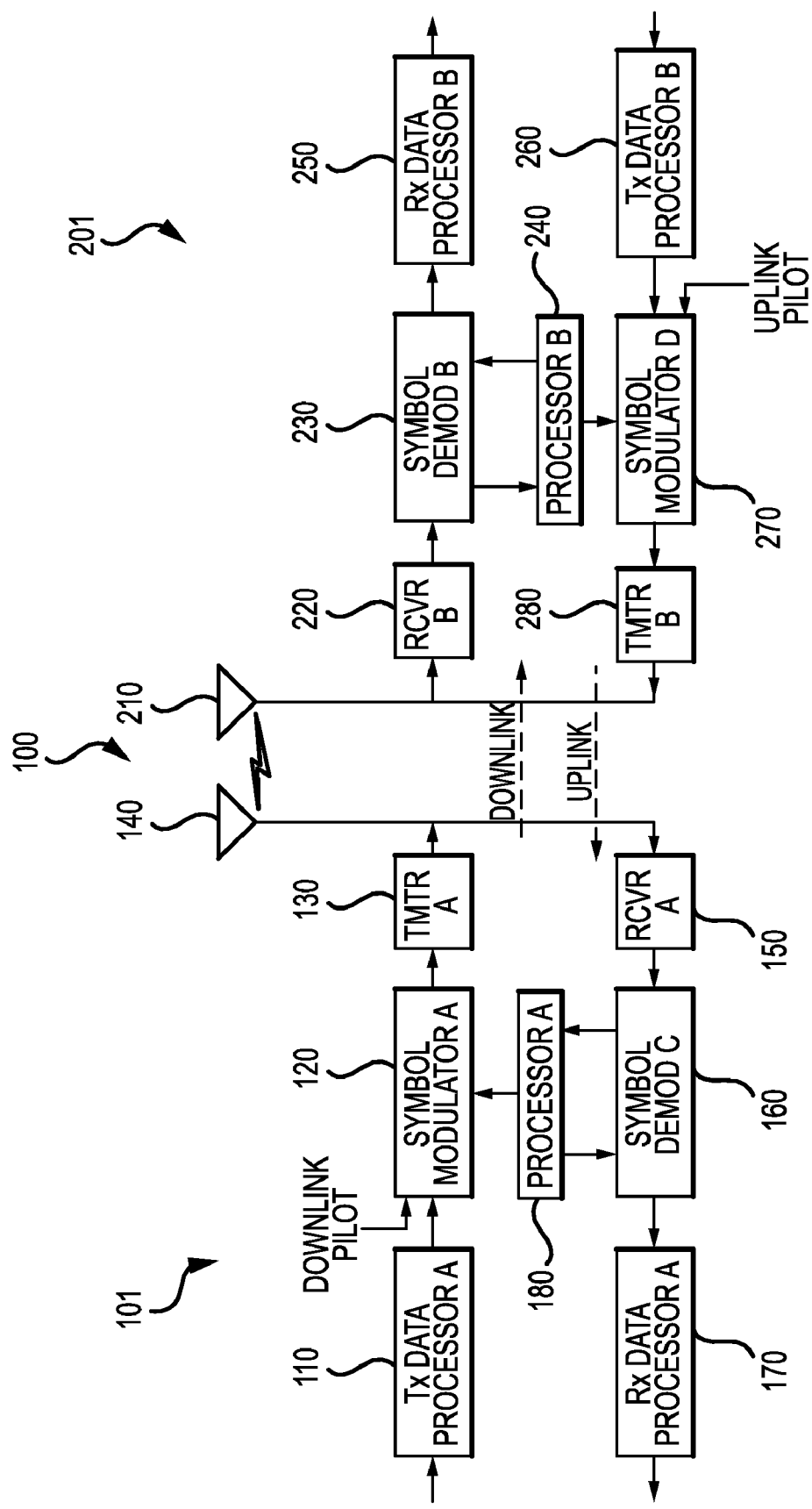
FIG. 1 is a block diagram illustrating an example access node/UE system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (a.k.a. base station) and a user equipment or UE 201 (a.k.a. wireless communication device). In the downlink leg, the access node 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
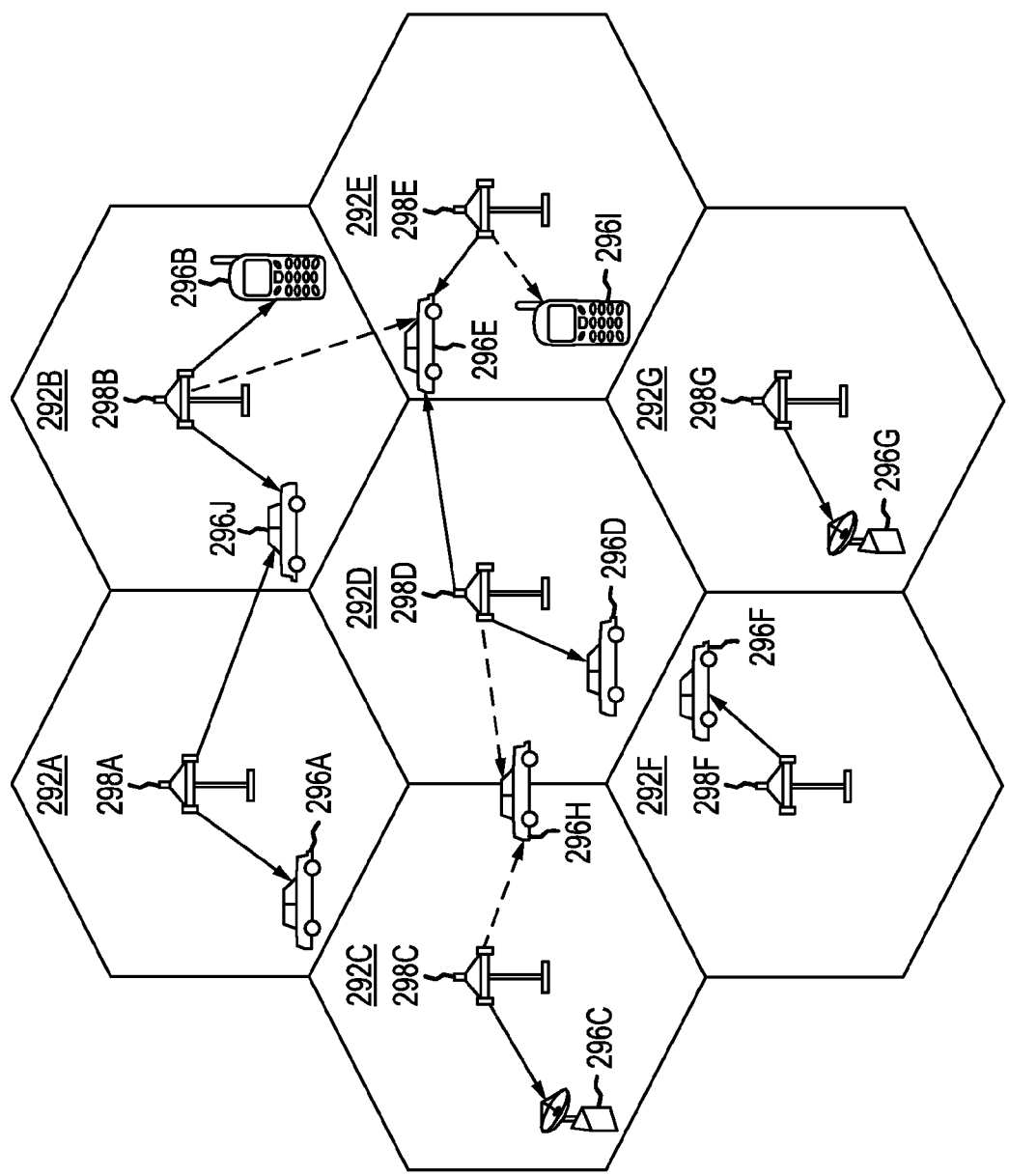
FIG. 2 illustrates an example of a wireless communications system that supports a plurality of users.

FIG. 2 illustrates an example of a wireless communications system 290 that supports a plurality of users. In FIG. 2, reference numerals 292A to 292G refer to cells, reference numerals 298A to 298G refer to base stations (BS) or base transceiver station (BTS) and reference numerals 296A to 296J refer to access User Equipments (UE). Cell size may vary. Any of a variety of algorithms and methods may be used to schedule transmissions in system 290. System 290 provides communication for a number of cells 292A through 292G, each of which is serviced by a corresponding base station 298A through 298G, respectively. Inter-system (i.e., inter-radio access technology (IRAT) transition) handover occurs when an ongoing call is transitioned between a cell of one network and a cell of another network. Such a transition may occur, for example, between a WCDMA site and a GSM site. For instance, if there is a radio frequency with high interference in a WCDMA cell, or if signal strength falls below a certain threshold, the WCDMA network may request the UE to measure and report on signal quality of a nearby GSM cell ("neighbor GSM cell"). This measurement is then used to facilitate a transition to the GSM cell. Generally, if a transition does not occur, the service (e.g., a voice call) is dropped. If the service is dropped, a UE may make a cell reselection to the GSM network by beginning a new connection with the GSM network after the service drops. However, user experience is affected.

In one example, as an UE within a cell (source cell) approaches the edge of its coverage area and near the coverage area of another cell (target cell), an inter-radio access technology (IRAT) transition may be triggered if the signal quality from the approaching target cell is higher than the signal quality from the source cell, for example, for a continuous X time interval. One skilled in the art would understand that the value of X can be chosen based on system parameters, application characteristic and/or user choice without affecting the scope or spirit of the present disclosure. Transitioning the wireless access connection of the UE between wireless systems requires a finite amount of time to complete. For example, if the UE starts in the source cell employing 3G radio access technology and begins transitioning to the target cell employing 2G radio access technology, the UE must start collecting system information from the BS within the target cell. This process may not be completed for some time, e.g., several seconds such as 3-5 seconds for some systems. Meanwhile, for example, a voice call that is in progress from the source cell may be dropped or its signal quality may be compromised. Facilitating to complete collecting all the essential system information from the target cell and to perform mobility information update on the target cell and its associated radio access technology (RAT) would improve the efficiency of the transition and reduce dropping service. One skilled in the art would understand that the scope and spirit of the present disclosure are not affected by other examples of radio access technologies employed by other wireless systems, including but not limited to, UMTS, WCDMA, GSM, GSM/GPRS/EDGE, LTE, IS-95, CDMA2000, EVDO or UMB, etc.

Figure 3:
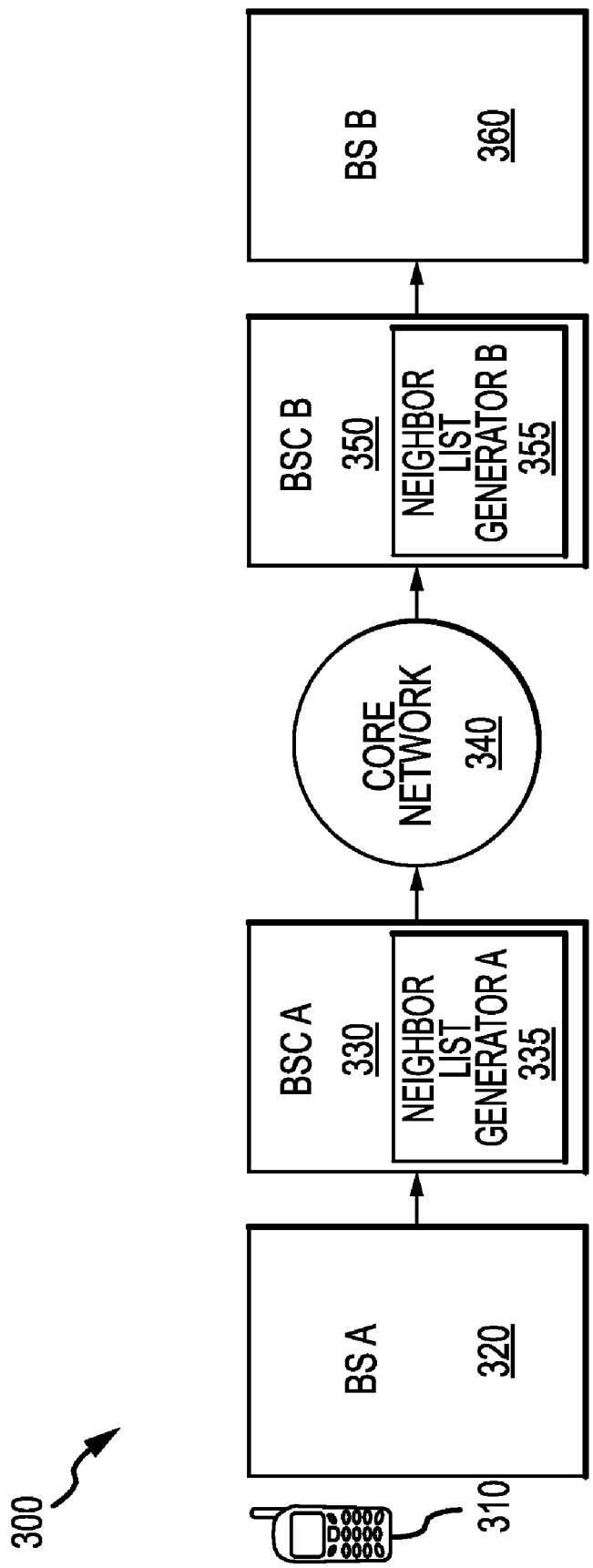
FIG. 3 illustrates an example of a wireless communication system for inter-radio access technology (IRAT) transition.

FIG. 3 illustrates an example of a wireless communication system 300 for inter-radio access technology (IRAT) transition. Illustrated in FIG. 3, the wireless communication network 300 comprises a user equipment 310, a base station (BS) A 320, a base station controller (BSC) A 330, a core network 340, a second base station controller (BSC) B 350 and a second base station (BS) B 360. In one example the UEs include mobile phones (handsets), computers with wireless Internet connectivity, WiFi and WiMAX compatible devices etc. The core network 340 is an infrastructure which interconnects a user (i.e., user equipment) with other users using different access networks. For example, the core network can provide mobility management, session management and transport for Internet Protocol (IP) packet services in GSM and UMTS (i.e., WCDMA) networks. In one example of FIG. 3, the core network 340 is linked to a WCDMA side via base station controller A 330 and base station A 320. The base station controller A 330 in this example is a radio network controller (RNC). The RNC is the governing entity in the UMTS radio access network (UTRAN) that is responsible for controlling the base stations which are connected to the RNC. For example, the RNC is responsible for radio resource allocation to a UE, frequency administration and/or handover between base stations.

The RNC (i.e., base station controller A 330) includes a neighbor list generator 335. The neighbor list generator 335 generates a list of GSM neighbor cells for handover from WCDMA to GSM. On the other side, the core network 340 is linked to a GSM side via base station controller B 350 and base station B 360 as illustrated in FIG. 3. To facilitate an IRAT handover, measurement control information such as neighbor list information is retrieved from the network, for use by the UE 310. In one scenario, a neighbor list is provided to the UE 310 to indicate which GSM cells are accessible and/or inaccessible to the UE operating in the WCDMA cell. Based on the list, the network decides whether an IRAT handover may take place between cells. Handover based on neighbor list information avoids dropped service and provides continuity in service. A reduction in the time taken to identify available neighbor cells (for example available GSM cells) through a neighbor list update avoids dropped services due to radio link failure. This can be achieved, for example, by maintaining GSM frequency offset and timing information during a GSM neighbor list update. As opposed to scanning the same GSM neighbor cells from the beginning each time, maintenance (storage) of frequency offset and timing information of the GSM neighbor cells from the last update allows for faster and more efficient identification of the same GSM neighbors. During an active call, a UE is often in a soft handover condition in which it receives signals from multiple cells. The set of cells with which the UE is in soft handover is called the Active Set. The wireless network, for example, UTRAN sends an ActiveSetUpdate (ASU) message to the UE to add or remove cells from the active set based on event 1A or event 1B which the UE reports.

An "event 1A" occurs when a primary common pilot channel (P-CPICH) enters the reporting range. The P-CPICH provides an in-cell timing reference and is scrambled with a primary scrambling code (PSC). An "event 1B" occurs when a P-CPICH leaves the reporting range.

Following the UE reporting an event 1A or an event 1B, the network sends an ActiveSetUpdate (ASU) message to the UE to add or delete a cell in the active set. The ActiveSetUpdate message is followed by a measurement control message (MCM). The measurement control message (MCM) determines the types of measurements performed by the UE and the types of measurements performed on the neighbor cells. Types of measurements include, but are not limited to, intra-frequency measurements, inter-frequency measurements, quality measurements (e.g., block error rate), UE internal measurements (e.g., UE transmitted power), traffic volume measurements (e.g., RLC buffer payload) and UE position measurements. In one aspect, the MCM includes a list of neighbor cells to the UE.

After the UE receives an MCM, the UE measures the received signal quality of the neighbor cells, for example GSM cells, on the list and reports those measurements to the source cell for further relaying. The UE may be required to search for and report the best signal quality (i.e., strongest signal strength) within a specified time. Handover measurements in WCDMA may use a "compressed mode." While operating in WCDMA, a transmission gap can be inserted into the WCDMA frame during transmission of data between the UE and its base station. To obtain a transmission gap, the data portion of the WCDMA frame is truncated, i.e., put in "compressed mode." However, the integrity of the data is preserved through various methods (such as an increase in data rate with a decrease in spreading factor) known to one skilled in the art. Having a transmission gap allows the UE to measure receive signal quality from neighbor cells during the gap.

For instance, during the transmission gaps in certain WCDMA frames, an RF receiver of the UE is tuned to the GSM frequency to retrieve frequency and timing information from GSM neighbor cells. Reception of a signal from a GSM neighbor cell without any a priori information may start with some uncertainty in frequency and in timing. For example, the frequency uncertainty may be due to oscillator frequency offsets and drifts or due to relative motion resulting in a Doppler frequency shift. For example, the timing uncertainty may be due to the lack of initial synchronization information. The frequency correction channel (FCH) provides the UE with the frequency reference of the GSM neighbor cell, and the synchronization channel (SCH) supplies the UE with the training sequence it needs to be able to demodulate the information coming from the GSM neighbor cell. For example, the UE operating in the WCDMA cell may detect the FCH channel to obtain a frequency offset information between the WCDMA cell and a GSM neighbor cell. The UE may decode SCH to obtain timing information for that GSM neighbor cell.

In one aspect, in an ActiveSetUpdate (ASU) message, the network orders the UE to delete certain GSM neighbor cells from the active set and at the same time add the same GSM neighbor cells again. In another example, the UE receives an ASU to delete certain GSM neighbor cells from the active set, but after a very short period, the UE receives another ASU message to add the same GSM neighbor cells that were just deleted from the active set. To improve efficiency and provide faster IRAT handover, after the UE has successfully identified a viable GSM neighbor cell (during a neighbor list update), the UE maintains the information of the GSM neighbor cell (e.g., frequency offset information found during FCH tone detection and timing information found during SCH decode) for a predetermined time period T. Once skilled in the art would understand that various durations of the time period T can be used and that the time period T may be chosen based on system parameters, application considerations and user choice without affecting the scope and spirit of the present disclosure.

In this example, if within the time period T, the UE is asked to identify the same GSM neighbor cell based on latest updated received signal strength indication (RSSI) ordering, the frequency offset and timing information pertaining to that GSM neighbor cell can be extracted from the record since it has been preserved. Then, the UE can locate that GSM neighbor cell in a much faster time frame since the UE did not have to gather the information from scratch. In one aspect, the time period T corresponds to T_reconfirm_abort. This parameter is used in the WCDMA compressed mode, and configured by the network. T_reconfirm_abort is the maximum time allowed for the reconfirmation of the frequency offset and timing information for the GSM neighbor cell while taking into account that both the WCDMA cell (source cell in this example) and the GSM neighbor cell (target cell in this example) are changing continuously. Time period T does not exceed T_reconfirm_abort to guarantee that the frequency offset and timing information is current (i.e., not stale).

Figure 4:
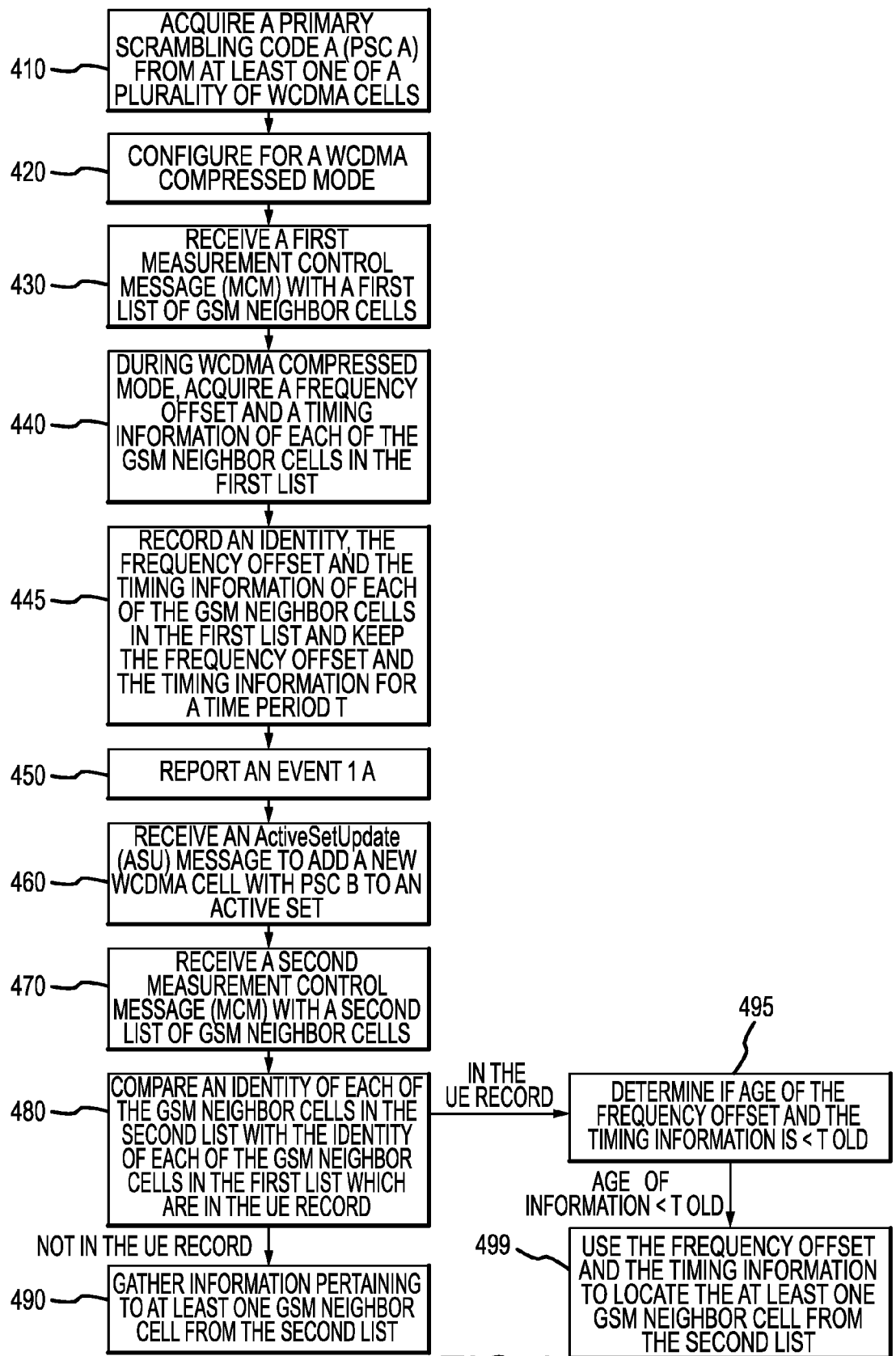
FIG. 4 illustrates an example flow diagram for maintaining frequency offset and timing info during neighbor list updates.

FIG. 4 illustrates an example flow diagram 400 for maintaining frequency offset and timing info during neighbor list updates. The example in FIG. 4 relates to preparation for an IRAT transition from a WCDMA cell to a GSM neighbor cell. One skilled in the art would understand that the example flow diagram can be generalized to accommodate IRAT transition from any two cell sites without affecting the scope and spirit of the present disclosure. In block 410, the UE acquires a primary scrambling code A (PSC A) from at least one of a plurality of WCDMA cells in an active set. Conventional acquisition methods for acquiring the PSC, known to one skilled in the art, may be used without affecting the scope and spirit of the present disclosure. The UE is able to distinguish a WCDMA cell by recognizing its primary scrambling code PSC. In block 420, the UE configures for a WCDMA compressed mode. In WCDMA, a transmission gap is inserted into the WCDMA frame during transmission of data between the UE and its base station. To obtain a transmission gap, the data portion of the WCDMA frame is truncated, i.e., put in "compressed mode." In block 430, the UE receives a first measurement control message (MCM) from the network. The MCM includes a first list of GSM neighbor cells. Following block 430, in block 440, during WCDMA compressed mode, the UE acquires information and measures the signal quality from each of the GSM neighbor cells in the first list. In one aspect, the information acquired includes frequency offset and timing information. In one aspect, signal quality is based on power measurements, signal-to-noise ratio, bit error rate, frame error rate, etc. In block 445, the UE records an identity, the frequency offset and the timing information of each of the GSM neighbor cells in the first list and keeps the frequency offset and the timing information for a time period T. Thus, the identity of each of the GSM neighbor cells in the first list is kept as part of the UE record. In order to add another radio link to the active set, the reporting event 1A has to be triggered. Event 1A notifies the network (for example UTRAN) that a new WCDMA cell has reached a power level above a predetermined power threshold $Th_{pwr}$. The new WCDMA cell is assigned a primary scrambling code B (PSC B) different from PSC A. In block 450, the UE reports an event 1A for PSC B to indicate that the new WCDMA cell with the PSC B has power level above the power threshold $Th_{pwr}$ and therefore the new WCDMA cell is viable as a target cell for a handover. From the perspective of the network, the network receives the event 1A report from the UE.

Following block 450, in block 460, the UE receives an ActiveSetUpdate (ASU) message from the network to add the new WCDMA cell with PSC B to the active set. In block 470, the UE receives a second MCM with a second list of GSM neighbor cells from the network. In block 480, the UE compares an identity of each of the GSM neighbor cells in the second list with the identity of each of the GSM cells in the first list which are recorded in the UE record from an earlier neighbor list update. From the comparison in block 480, if none of the GSM neighbor cells from the second list are included in the first list of GSM neighbor cells (i.e., is not part of the UE's record of GSM neighbor cells), the UE gathers information, such as frequency offset and timing information, pertaining to at least one of the GSM neighbor cells in the second list in block 490. In block 495, from the comparison in block 480, if at least one of the GSM neighbor cells in the second list is included in the first list of GSM neighbor cells (i.e., is already listed as part of the UE's record), the UE determines if the information (such as frequency offset and timing information) in its UE record pertaining to the at least one GSM neighbor cell from the second list has an "age" of less than the time period T In other words, determine if the information in the UE record pertaining to the at least one GSM neighbor cells from the second list is less than time period T old. One skilled in the art would understand that the value of the time period T may be chosen based on system parameters, application characteristics and/or user choice without affecting the scope and spirit of the present disclosure. Following block 495, in block 499, if the information is less than time period T old, the UE uses the information to locate the at least one GSM neighbor cell from the second list. Thus, the UE knows the information (e.g., frequency offset and timing information) for the at least one GSM neighbor cell and the associated base station identity code (BSIC) can be decoded. In GSM networks, the BSIC is broadcast on the synchronization channel (SCH) to identify the network color code (NCC) and the base station color code (BCC). In one aspect, one or more of the undertakings by the UE as described in FIG. 4 is based on instructions by the network. In one aspect, the network as described in the flow diagram of FIG. 4 is implemented by a processor resided outside the UE and in communication with the UE. Furthermore, one skilled in the art would understand that some of the steps of the flow diagram illustrated in FIG. 4 may be interchanged in their order without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art.

Figure 5:
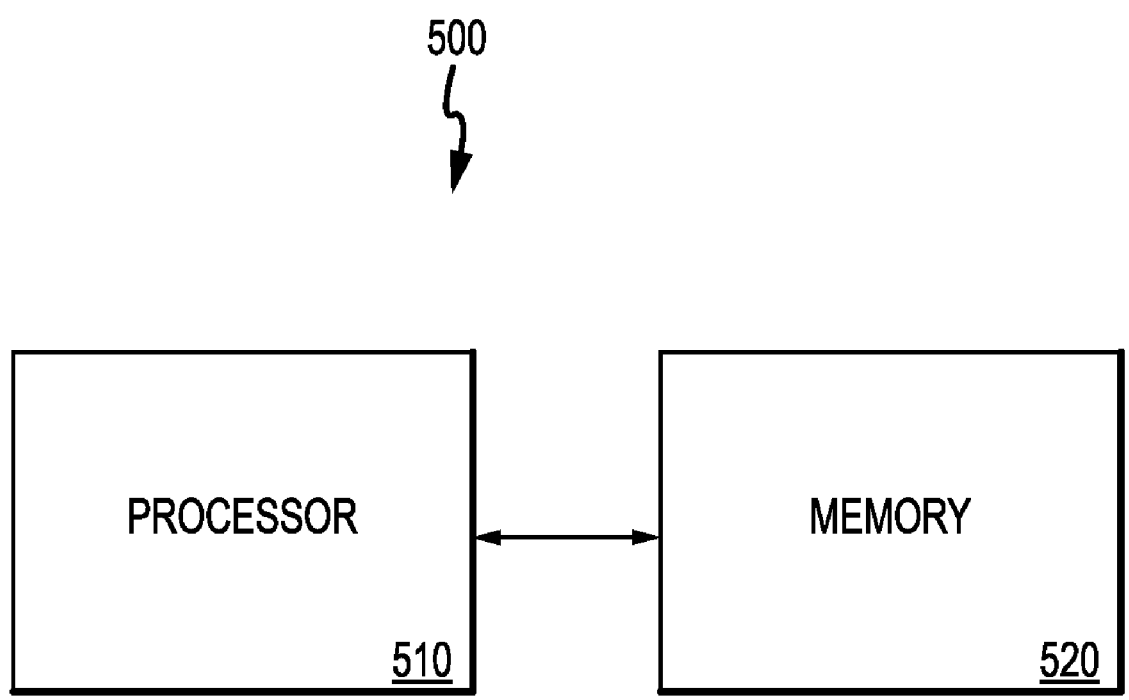
FIG. 5 illustrates an example of a device comprising a processor in communication with a memory for executing the processes for maintaining frequency offset and timing info during neighbor list updates.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 5 illustrates an example of a device 500 comprising a processor 510 in communication with a memory 520 for executing the processes for maintaining frequency offset and timing info during neighbor list updates. In one example, the device 500 is used to implement the algorithm illustrated in FIG. 4. In one aspect, the memory 520 is located within the processor 510. In another aspect, the memory 520 is external to the processor 510.

Figure 6:
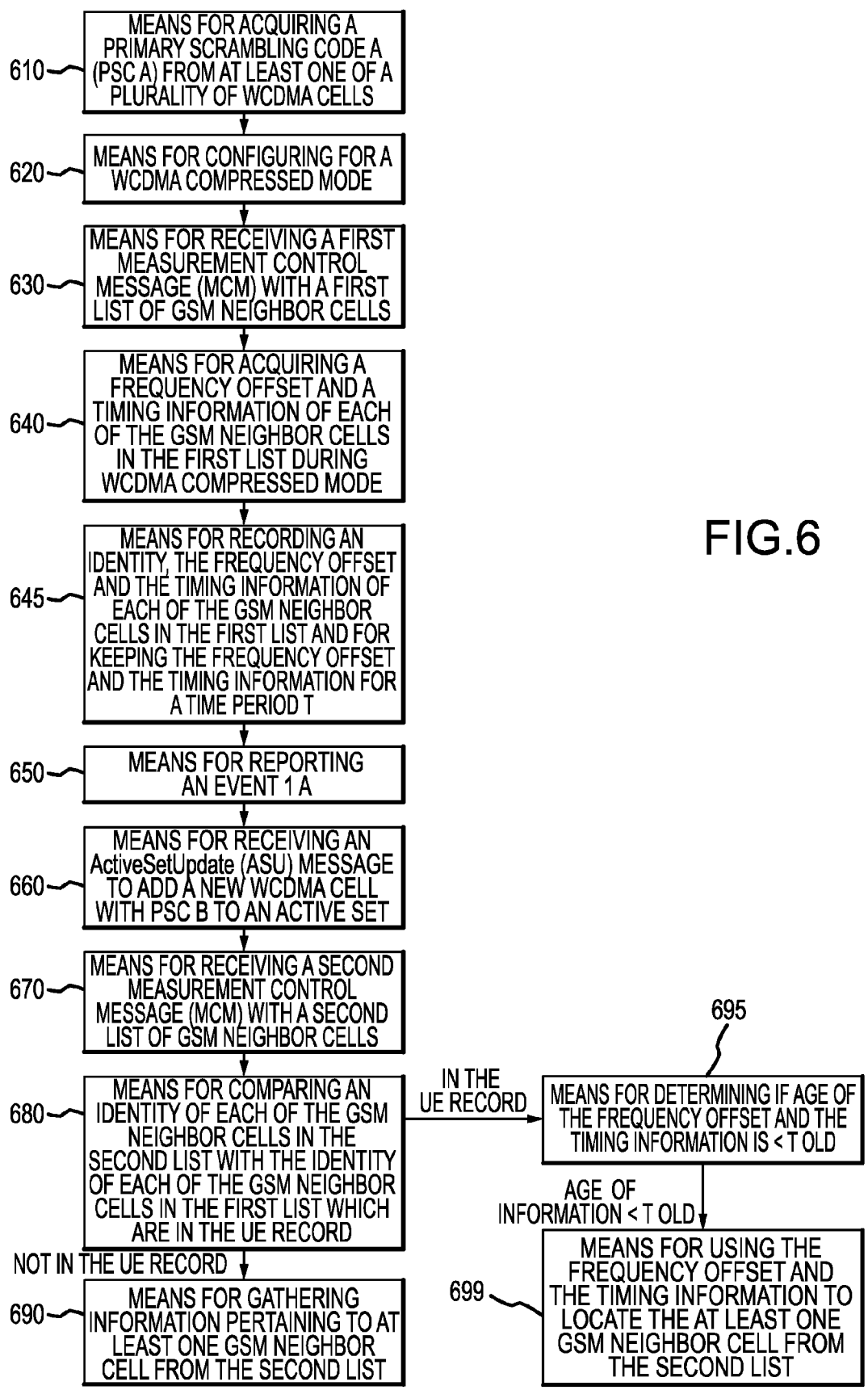
FIG. 6 illustrates an example of a device suitable for maintaining frequency offset and timing info during neighbor list updates.

FIG. 6 illustrates an example of a device 600 suitable for maintaining frequency offset and timing info during neighbor list updates. In one aspect, the device 600 is implemented by at least one processor comprising one or more modules configured to provide different aspects of for maintaining frequency offset and timing info during neighbor list updates6as described herein in blocks 610, 620, 630, 640, 645, 650, 660, 670, 680, 690, 695 and 699. For example, each module comprises hardware, firmware, software, or any combination thereof. In one aspect, the device 600 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method of maintaining frequency offset and timing information during neighbor list updates, comprising the steps of:
   acquiring, by a device, a frequency offset and a timing information of each of a first plurality of GSM neighbor cells;
   recording an identity, the frequency offset and the timing information of each of the first plurality of GSM neighbor cells and keeping the frequency offset and the timing information for a time period T in a record;
   receiving a list of a second plurality of GSM neighbor cells;
   comparing an identity of each of the second plurality of GSM neighbor cells with the identity of each of the first plurality of GSM cells in the record;
   if a GSM neighbor cell from the second plurality of GSM neighbor cells is not in the record, gathering frequency offset and timing information pertaining to the GSM neighbor cell; and
   if at least one GSM neighbor cell from the second plurality of GSM neighbor cells is in the record, determining if an age of the frequency offset and timing information pertaining to the at least one GSM neighbor cell is less than the time period T and if the age is less than the time period T, locating the at least one GSM neighbor cell using the corresponding recorded ones of the frequency offset and the timing information.

2. The method of claim 1 further comprising receiving a measurement control message (MCM) which includes a list of the first plurality of GSM neighbor cells.

3. The method of claim 2 further comprising configuring for a WCDMA compressed mode wherein frequency offset and timing information from the first plurality of GSM neighbor cells is acquired during the WCDMA compressed mode.

4. The method of claim 3 further comprising acquiring a primary scrambling code (PSC) from at least one of a plurality of WCDMA cells in an active set.

5. The method of claim 4 further comprising reporting an event 1A to indicate that a new WCDMA cell with a different primary scrambling code has a power level above a predetermined power threshold $Th_{pwr}$, wherein the new WCDMA cell is not part of the plurality of WCDMA cells.

6. The method of claim 5 further comprising receiving an ActiveSetUpdate message to add the new WCDMA cell to the active set.

7. The method of claim 1 wherein the time period T is a maximum time duration allowed for reconfirming frequency offset and timing information.

8. The method of claim 1, wherein the time period T is a time duration sufficient to avoid the recorded ones of the frequency offset and the timing information being stale.

9. The method of claim 1, further comprising:
   wherein the acquiring of the frequency offset and the timing information further comprises:
      obtaining each frequency offset from a frequency correction channel;
      obtaining each timing information from a synchronization channel; and
      wherein each frequency correction channel and each synchronization channel are associated with a GSM frequency corresponding to each of the first plurality of GSM neighbor cells; and
   wherein the locating of the at least one GSM neighbor cell further comprises locating in response to receiving a measurement control message (MCM).

10. A user equipment comprising a processor and a memory, the memory containing program code executable by the processor for performing the following steps:
- acquiring a frequency offset and a timing information of each of a first plurality of GSM neighbor cells;
- recording an identity, the frequency offset and the timing information of each of the first plurality of GSM neighbor cells and keeping the frequency offset and the timing information for a time period T in a record;
- receiving a list of a second plurality of GSM neighbor cells;
- comparing an identity of each of the second plurality of GSM neighbor cells with the identity of each of the first plurality of GSM cells in the record;
- if a GSM neighbor cell from the second plurality of GSM neighbor cells is not in the record, gathering frequency offset and timing information pertaining to the GSM neighbor cell; and
- if at least one GSM neighbor cell from the second plurality of GSM neighbor cells is in the record, determining if an age of the frequency offset and timing information pertaining to the at least one GSM neighbor cell is less than the time period T and if the age is less than the time period T, locating the at least. one GSM neighbor cell using the corresponding recorded ones of the frequency offset and the timing information.

11. The user equipment of claim 10 wherein the memory further comprising program code for receiving a measurement control message (MCM) which includes a list of the first plurality of GSM neighbor cells.

12. The user equipment of claim 11 wherein the memory further comprises program code for configuring for a WCDMA compressed mode wherein frequency offset and timing information from the first plurality of GSM neighbor cells is acquired during the WCDMA compressed mode.

13. The user equipment of claim 12 wherein the second plurality of GSM neighbor cells is received from a second measurement control message (MCM) triggered by an event 1A report.

14. The user equipment of claim 10, wherein the time period T is a maximum time duration allowed for reconfirming frequency offset and timing information.

15. The user equipment of claim 10, wherein the time period T is a time duration sufficient to avoid the recorded ones of the frequency offset and the timing information being stale.

16. The user equipment of claim 10, further comprising:
- wherein the program code for acquiring of the frequency offset and the timing information further comprises program code for:
  - obtaining each frequency offset from a frequency correction channel;
  - obtaining each timing information from a synchronization channel; and
  - wherein each frequency correction channel and each synchronization channel are associated with a GSM frequency corresponding to each of the first plurality of GSM neighbor cells; and
- wherein the program code for locating of the at least one GSM neighbor cell further comprises program code for locating in response to receiving a measurement control message (MCM).

17. A wireless communication device for maintaining frequency offset and timing information during neighbor list updates comprising:
- means for acquiring a frequency offset and a timing information of each of a first plurality of GSM neighbor cells;
- means for recording an identity, the frequency offset and the timing information of each of the first plurality of GSM neighbor cells and keeping the frequency offset and the timing information for a time period T in a record;
- means for receiving a list of a second plurality of GSM neighbor cells;
- means for comparing an identity of each of the second plurality of GSM neighbor cells with the identity of each of the first plurality of GSM cells in the record;
- means for determining if an age of the frequency offset and timing information pertaining to at least one GSM neighbor cell from the second plurality of GSM neighbor cells is less than the time period T, wherein the at least one GSM neighbor cell is in the record; and
- means for locating the at least one GSM neighbor cell from the second plurality of GSM neighbor cells using the corresponding recorded ones of the frequency offset and the timing information, when the age of the frequency offset and timing information is less than the time period T.

18. The wireless communication device of claim 17 further comprising means for gathering frequency offset and timing information pertaining to a GSM neighbor cell from the second plurality of GSM neighbor cells wherein the GSM neighbor cell is not in the record.

19. The wireless communication device of claim 18 further comprising means for receiving a measurement control message (MCM) which includes a list of the first plurality of GSM neighbor cells.

20. The wireless communication device of claim 19 further comprising means for configuring for a WCDMA compressed mode wherein frequency offset and timing information from the first plurality of GSM neighbor cells is acquired during the WCDMA compressed mode.

21. The wireless communication device of claim 17 wherein the wireless communication device is one of a mobile phone, a computer with wireless Internet connectivity, a WiFi compatible device or a WiMAX compatible device.

22. The wireless communication device of claim 17, wherein the time period T is a maximum time duration allowed for reconfirming frequency offset and timing information.

23. The wireless communication device of claim 17, wherein the time period T is a time duration sufficient to avoid the recorded ones of the frequency offset and the timing information being stale.

24. The wireless communication device of claim 17, further comprising:
- wherein the means for acquiring the frequency offset and the timing information further comprises:
  - means for obtaining each frequency offset from a frequency correction channel;
  - means for obtaining each timing information from a synchronization channel; and
  - wherein each frequency correction channel and each synchronization channel are associated with a GSM frequency corresponding to each of the first plurality of GSM neighbor cells; and
- wherein the means for locating the at least one GSM neighbor cell further comprises means for locating in response to receiving a measurement control message (MCM).

25. A computer program recorded on a non-transitory computer-readable medium, while the computer program executed by a processor, performing the steps of:

acquiring a frequency offset and a timing information of each of a first plurality of GSM neighbor cells;

recording an identity, the frequency offset and the timing information of each of the first plurality of GSM neighbor cells and keeping the frequency offset and the timing information for a time period T in a record;

receiving a list of a second plurality of GSM neighbor cells;

comparing an identity of each of the second plurality of GSM neighbor cells with the identity of each of the first plurality of GSM cells in the record;

determining if an age of the frequency offset and timing information pertaining to at least one GSM neighbor cell from the second plurality of GSM neighbor cells is less than a time period T, wherein the at least one GSM neighbor cell is in the record; and locating the at least one GSM neighbor cell from the second plurality of GSM neighbor cells using the corresponding recorded ones of the frequency offset and the timing information, wherein when the age of the frequency offset and timing information is less than the time period T.

26. The computer program of claim 25 further comprising a step of gathering frequency offset and timing information pertaining to a GSM neighbor cell from the second plurality of GSM neighbor cells wherein the GSM neighbor cell is not in the record.

27. The computer program of claim 26 further comprising a step of receiving a measurement control message (MCM) which includes a list of the first plurality of GSM neighbor cells.

28. The computer program of claim 27 further comprising a step of configuring for a WCDMA compressed mode wherein frequency offset and timing information from the first plurality of GSM neighbor cells is acquired during the WCDMA compressed mode.

29. The computer program of claim 25, wherein the time period T is a maximum time duration allowed for reconfirming frequency offset and timing information.

30. The computer program of claim 25, wherein the time period T is a time duration sufficient to avoid the recorded ones of the frequency offset and the timing information being stale.

31. The computer program of claim 25, further comprising:

wherein the acquiring of the frequency offset and the timing information further comprises:
obtaining each frequency offset from a frequency correction channel;
obtaining each timing information from a synchronization channel; and
wherein each frequency correction channel and each synchronization channel are associated with a GSM frequency corresponding to each of the first plurality of GSM neighbor cells; and wherein the locating of the at least one GSM neighbor cell further comprises locating in response to receiving a measurement control message (MCM).

32. A method of maintaining frequency offset and timing information during neighbor list updates, comprising the steps of:

acquiring, by a device, a frequency offset and a timing information of each of a first plurality of GSM neighbor cells;

recording an identity, the frequency offset and the timing information of each of the first plurality of GSM neighbor cells and keeping the frequency offset and the timing information for a time period T in a record;

receiving a list of a second plurality of GSM neighbor cells;

comparing an identity of each of the second plurality of GSM neighbor cells with the identity of each of the first plurality of GSM cells in the record;

if a GSM neighbor cell from the second plurality of GSM neighbor cell is not in the record, gathering frequency offset and timing information pertaining to the GSM neighbor cell;

if at least one GSM neighbor cell from the second plurality of GSM neighbor cells is in the record, determining if an age of the frequency offset and timing information pertaining to the at least one GSM neighbor cell is less then the time period T and if the age is less than the time period T, locating the at least one GSM neighbor cell; and wherein the time period T is a maximum time duration allowed for reconfirming frequency offset and timing information.

* * * * *